(12) United States Patent
Abbott et al.

(10) Patent No.: US 7,826,572 B2
(45) Date of Patent: Nov. 2, 2010

(54) DYNAMIC OPTIMIZATION OF OVERLAP-AND-ADD LENGTH

(75) Inventors: William L. Abbott, Portola Valley, CA (US); Yehuda Azenkot, San Jose, CA (US)

(73) Assignee: Texas Instruments Incorporated, Dallas, TX (US)

( * ) Notice: Subject to any disclaimer, the term of this patent is extended or adjusted under 35 U.S.C. 154(b) by 681 days.

(21) Appl. No.: 11/818,099

(22) Filed: Jun. 13, 2007

(65) Prior Publication Data

US 2008/0310565 A1 Dec. 18, 2008

(51) Int. Cl.
| | |
|---|---|
| H03D 1/06 | (2006.01) |
| H03D 11/04 | (2006.01) |
| H03K 5/01 | (2006.01) |
| H03K 6/04 | (2006.01) |
| H04B 1/10 | (2006.01) |
| H04L 1/00 | (2006.01) |
| H04L 25/08 | (2006.01) |
| H04K 1/10 | (2006.01) |
| H04L 27/28 | (2006.01) |
| H04J 11/00 | (2006.01) |

(52) U.S. Cl. ............... 375/348; 375/260; 370/210
(58) Field of Classification Search ............... 375/248, 375/260, 348
See application file for complete search history.

(56) References Cited

U.S. PATENT DOCUMENTS

| | | | |
|---|---|---|---|
| 2003/0088406 A1* | 5/2003 | Chen et al. | 704/219 |
| 2005/0058145 A1* | 3/2005 | Florencio et al. | 370/412 |
| 2005/0157801 A1* | 7/2005 | Gore et al. | 375/260 |
| 2005/0208897 A1 | 9/2005 | Lyons et al. | |
| 2006/0109897 A1* | 5/2006 | Guo et al. | 375/232 |
| 2006/0159187 A1 | 7/2006 | Wang et al. | |
| 2006/0159189 A1 | 7/2006 | Balakrishnan et al. | |
| 2007/0094031 A1* | 4/2007 | Chen | 704/267 |
| 2007/0171993 A1* | 7/2007 | Lai et al. | 375/260 |
| 2007/0280366 A1* | 12/2007 | Aytur et al. | 375/260 |
| 2008/0165909 A1* | 7/2008 | Amanullah | 375/365 |
| 2009/0028220 A1* | 1/2009 | Roh et al. | 375/136 |

OTHER PUBLICATIONS

Lowe, D. et al, Adaptive Overlap-Add Equilization for MB-OFDM Ultra-Wideband; Int'l Symposium on Communication & Information Technologies, Oct. 18-20, 2006; Bangkok, Thailand.

(Continued)

*Primary Examiner*—David C Payne
*Assistant Examiner*—Erin M File
(74) *Attorney, Agent, or Firm*—Steven A. Shaw; W. James Brady; Frederick J. Telecky, Jr.

(57) ABSTRACT

A method of adjusting overlap-and-add length for zero-padded suffixes. The method includes, based on a channel impulse response, estimating an effective channel length. When the effective channel length is less than a default overlap-and-add length and greater than a minimum length, the method includes setting the overlap-and-add length to the effective channel length. When the effective channel length is less than the minimum length, the method includes setting the overlap-and-add length to the minimum length. When the effective channel length is greater than the default overlap-and-add length, the method includes setting the overlap-and-add length to the default overlap-and-add length.

28 Claims, 6 Drawing Sheets

OTHER PUBLICATIONS

B. Muquet et al. "OFDM with trailing zeroes versus OFDM with cyclic prefix : Links, Comparisons and Application to the HIPERLAN/2 System", IEEE International Conference on Communications, Jun. 18-22, 2000, pp. 1045-1053. See figures 3 and 4.

K. Shi et al. "On the design of robust multiband OFDM Ultra-Wideband receivers", Texes Wireless Symposium 2005, pp. 81-85. See the abstract and figure 1.

* cited by examiner

DYNAMIC OPTIMIZATION OF OVERLAP-AND-ADD LENGTH

BACKGROUND INFORMATION

In order for electronic devices to communicate, a wireless or wired protocol (i.e., standard) defines hardware and software parameters that enable the devices to send, receive, and interpret data. Frequency division multiplexing or frequency division modulation (FDM) is a technology that transmits multiple signals simultaneously over a single transmission path, such as a cable or wireless system. Each signal travels within its own unique frequency range (carrier), which is modulated by data (e.g., text, voice, video, etc.).

Orthogonal FDM (OFDM) distributes the data over a large number of carriers that are spaced apart at precise frequencies. To mitigate multi-path energy and to enable a transmitter and receiver to switch between different frequency bands some wired and wireless protocols define a guard interval that is placed before transmitted information symbols as a prefix. Other protocols define a guard interval that is placed after transmitted information symbols as a suffix (e.g., a zero-padded suffix or "ZPS"). In either case, the guard interval reduces interference between information symbols by providing time for multi-path reflections to attenuate.

Figure 1A:
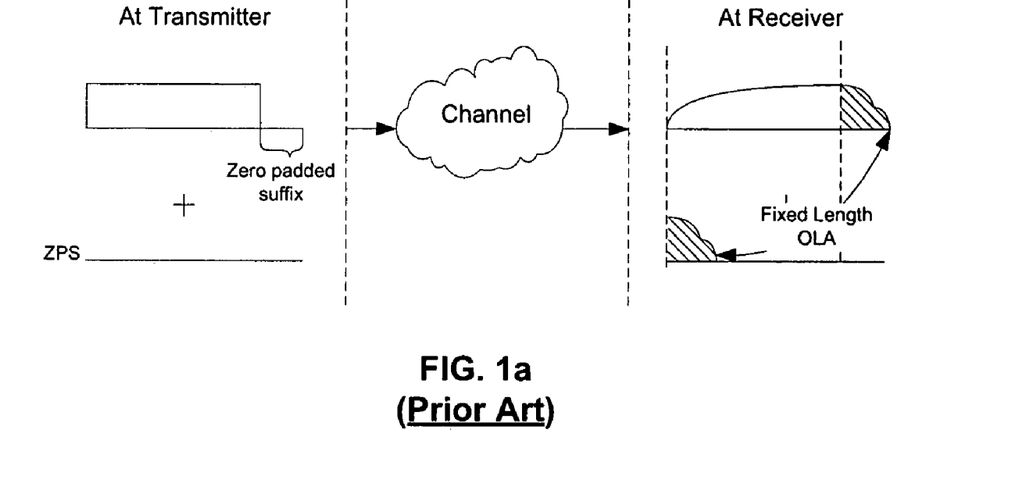
FIG. 1a illustrates zero padded suffix operations at a transmitter and receiver.

FIG. 1a illustrates zero padded suffix operations at a transmitter and receiver. When a ZPS is used (e.g., in a Multi-Band Orthogonal Frequency Division Multiplexing (OFDM) system), a receiving device may use an "overlap-and-add" operation to add samples of the ZPS to samples of the symbol preceding the ZPS. For example, the overlap-and-add operation may combine the "N" samples of the ZPS with the first N samples of the symbol preceding the ZPS. The overlap-and-add operation may result in too much noise being added to the symbol.

Figure 1B:
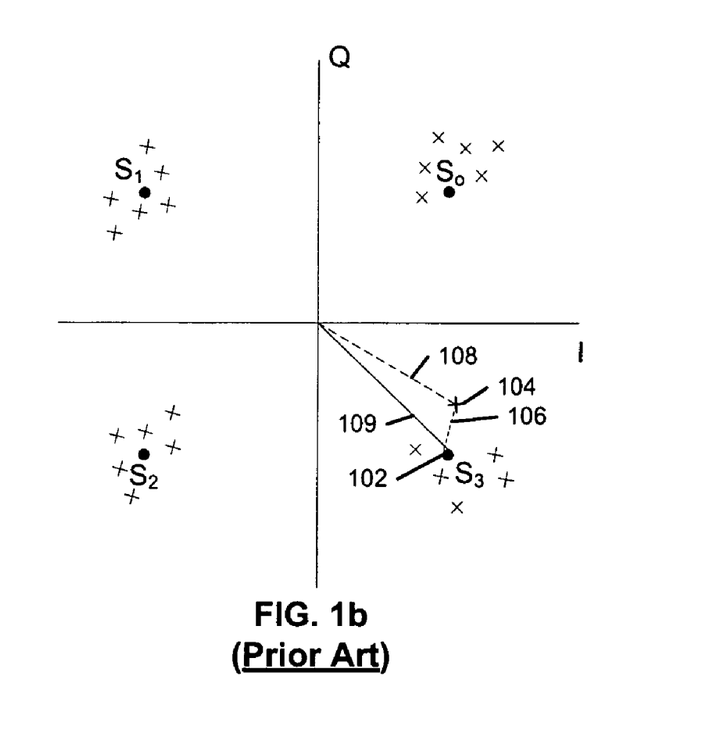
FIG. 1b illustrates an I, Q plane for a quaternary phase shit key modulation (QPSK) scheme which has a constellation of four ideal possible symbols $S_o$, $S_1$, $S_2$, and $S_3$ and received signal samples 'x' that are not aligned with the ideal possible symbols.

There are a variety of techniques for representing noise at a receiver. FIG. 1b illustrates an I, Q plane for a quaternary phase shift key modulation (QPSK) scheme which has a constellation of four ideal possible symbols $S_o$, $S_1$, $S_2$, and $S_3$ and received signal samples 'x' that are not aligned with the ideal possible symbols. The 'x's' next to each of the ideal symbols illustrate the common situation that occurs at a receiver that receives a QPSK signal that has passed through a noisy channel. The received modulated signal samples are not aligned with the ideal constellation points. For example, received symbol 104 is not aligned with ideal constellation symbol $S_3$ 102. The error distance 106 between the vector 108 to received symbol 104 and the vector 109 to ideal symbol $S_3$ is representative of the noise that led to the misalignment. An error vector magnitude (EVM) metric is defined as the square root of the mean of the square of the error distances for received symbol samples around each of the ideal constellation symbols. The EVM is calculated per frame of received symbols or some other period of time. The EVM may be expressed in dB or as % RMS (root-mean-square) of the signal strength. EVM can be calculated for modulation schemes other than QPSK.

Typically, the greater the noise that is affecting modulated signals the greater the error distance between received signal samples and the ideal symbol with which they are associated. The greater the error distance the more difficult it becomes to map received signal samples to their associated ideal symbol and may prevent communication from occurring in some instances. Consequently, the problem of relatively too much noise being added during overlap-and-add operation is a significant and very substantial issue that needs addressing with solutions that overcome the deficiencies of the prior art.

SUMMARY

In an embodiment, a method of adjusting overlap-and-add length for zero-padded suffixes includes, based on a channel impulse response, estimating an effective channel length. When the effective channel length is less than a default overlap-and-add length and greater than a minimum length, the method includes setting the overlap-and-add length to the effective channel length. When the effective channel length is less than the minimum length, the method includes setting the overlap-and-add length to the minimum length. When the effective channel length is greater than the default overlap-and-add length, the method includes setting the overlap-and-add length to the default overlap-and-add length.

BRIEF DESCRIPTION OF THE DRAWINGS

The invention is illustrated by way of example, and not limitation, in the figures of the accompanying drawings in which like references denote similar elements, and in which.

DETAILED DESCRIPTION

According to the invention, methods and apparatus for dynamic optimization of the overlap-and-add length are described. In the following description, for purposes of explanation, numerous specific details are set forth in order to provide a thorough understanding of embodiments according to the invention. It will be evident, however, to one of ordinary skill in the art that the invention may be practiced in a variety of contexts including orthogonal frequency division multiplexing systems without these specific details. In other instances, well-known operations, steps, functions and elements are not shown in order to avoid obscuring the description.

Parts of the description will be presented using terminology commonly employed by those skilled in the art to convey the substance of their work to others skilled in the art, such as overlap-and-add, zero-padded suffix, fast Fourier transform (FFT), channel impulse response estimate, frequency equalization, signal-to-noise ratio (SNR) and so forth. Various operations will be described as multiple discrete steps performed in turn in a manner that is most helpful in understanding the embodiments according to the invention. However, the order of description should not be construed as to imply that these operations are necessarily performed in the order that they are presented, or even order dependent. Repeated usage of the phrases "in an embodiment," "an alternative embodiment," or an "alternate embodiment" does not necessarily refer to the same embodiment, although it may. Additionally, one of ordinary skill in the art would appreciate that a graphical description of an apparatus in the figures of the drawings interchangeably represents either an apparatus or a method.

Embodiments of the present disclosure illustrate methods and apparatus that reduce the amount of noise that is introduced to samples of a received signal when an overlap-and-add operation is used with a zero-padded suffix (ZPS). Embodiments of the present disclosure illustrate methods and apparatus that reduce the latency in providing received signal samples to FFT logic. Embodiments of the present disclosure illustrate methods and apparatus that reduce the amount of noise that is introduced to samples of a received signal when an overlap-and-add operation is used with a zero-padded suffix (ZPS) and that reduce the latency in providing received signal samples to FFT logic. This description incorporates herein by reference U.S. patent application Ser. No. 11/331,463 titled "Methods And Systems For Performing An Overlap-And-Add Operation," filed on Jan. 13, 2006. The immediately aforementioned application is referred to herein as the '463 application. The '463 application also discloses embodiments in which latency in providing received signal samples to FFT logic is reduced. One of ordinary skill in the art would appreciate how the teachings of the '463 application would be combined with the present disclosure in yet other alternative embodiments of the invention in order to also achieve noise and latency reduction.

Electronic devices that communicate wirelessly (or via a wired connection) implement a variety of techniques to prepare, send, receive, and recover data. For example, data preparation techniques may include data scrambling, error correction coding, interleaving, data packet formatting, and/or other techniques. The data to be transmitted is converted into blocks of data (i.e., bits) transmitted as information symbols. Each information symbol is associated with a constellation of complex amplitudes. If data communication is wireless, one or more antennas "pick up" the wireless signal, after which data is recovered by sampling the received signal and decoding each information symbol. To recover data, a receiving device may implement techniques such as signal amplification, digitization, sample rate conversion, equalization, demodulation, de-interleaving, de-coding, and/or de-scrambling.

In some communication systems, such as a Multi-Band Orthogonal Frequency Division Multiplexing (MB-OFDM) system, a zero-padded suffix (ZPS) follows each information symbol. Embodiments of the disclosure illustrate methods and apparatus that reduce the amount of noise that is introduced to samples when an overlap-and-add operation is used with a ZPS. In at least some embodiments, the noise reduction is achieved by adding less than all the ZPS samples to the corresponding first samples of the symbol being received. For example, in some embodiments, if the ZPS corresponds to "N" samples and the information symbol corresponds to M samples, then m ZPS samples are added to the first m samples of the information symbol preceding the ZPS, where m<N. The remaining N-m samples of the ZPS are ignored. The M samples of the information symbol—whose first m samples have now had the first m ZPS samples added to them—are provided to the receiver's FFT logic. In alternative embodiments, some of a symbol's M samples are provided to the receiver's FFT logic before the m ZPS samples are added to the first m samples of the symbol. Several such alternative embodiments which minimize noise and latency in providing samples to the receiver's FFT logic are described herein. One of ordinary skill in the art would understand how, in yet other alternative embodiments, the teachings in the '463 application would be combined with the present disclosure so that latency and noise are also minimized on a per OFDM packet basis.

Figure 2A:
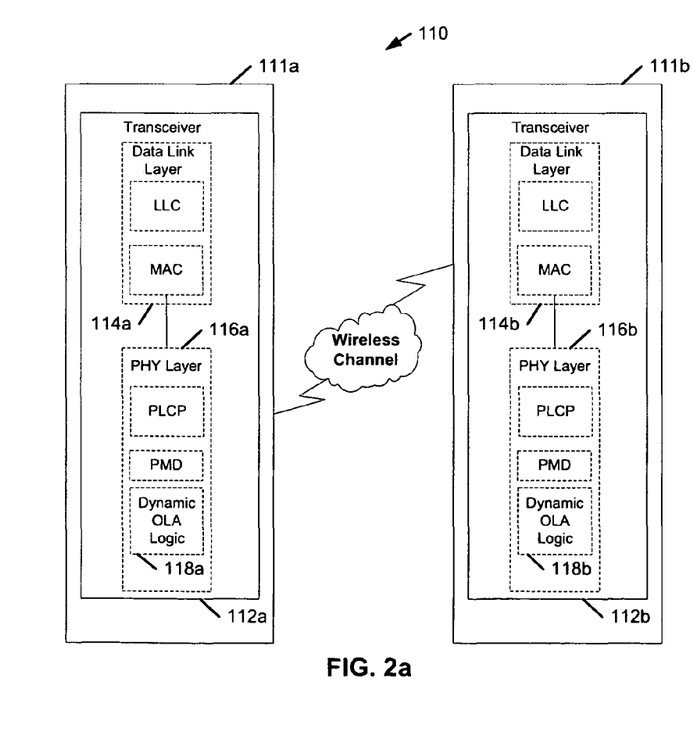
FIG. 2a illustrates a system in accordance with an embodiment of the disclosure.

FIG. 2a illustrates a system 110 in accordance with an embodiment of the disclosure. As shown in FIG. 2a, system 110 comprises devices 111a and 111b. Device 111a includes a transceiver 112a having a data link layer 114a and a PHY layer 116a. Similarly, device 111b includes a transceiver 112b having a data link layer 114b and a PHY layer 116b. In at least some embodiments, the data link layers and the PHY layers function according to a standardized communication protocol. For clarity, only the components of device 111a are described in greater detail. However, the same discussion would apply to the components of device 111b.

In order for device 111a to communicate wirelessly, the PHY layer 116a and the data link layer 114a perform several functions such as preparing, transmitting, receiving, and decoding wireless signals. In some embodiments, the PHY layer 116a implements a physical layer convergence procedure (PLCP) sub-layer, a physical medium dependent (PMD) sub-layer and dynamic overlap-and-add logic 118a.

The PLCP sub-layer of device 111a enables carrier sense and clear channel assessment (CCA) signals to be provided to the data link layer 114a (indicating when the PHY layer 116a is in use). The PMD sub-layer of the PHY layer 116a provides encoding, decoding, modulation, and/or demodulation of information symbols for device 111a. In some embodiments, the PMD sub-layer of the PHY layer 116a permits device 111a to implement modulation techniques such as multi-band OFDM. The PMD sub-layer also may provide functions such as analog-to-digital and/or digital-to-analog data conversion.

As shown, the data link layer 114a implements a logical link control (LLC) and a medium access control (MAC). During transmission of data, the LLC assembles data frames with address and cyclic redundancy check (CRC) fields. During reception of data, the LLC disassembles data frames, performs address recognition, and performs CRC validation. The MAC functions, at least in part, to coordinate transmission of data between the electronic device 111a and other devices (e.g., device 111b).

The dynamic overlap-and-add logic 118*a* shown in FIG. 2*a* enables dynamic overlap-and-add operations to be performed, on the fly for each received OFDM packet, using the overlap-and-add (OLA) length (OLAL) that provides best performance. For example, in embodiments that implement multi-band OFDM, overlap-and-add operations are performed (when data is received) to overlap-and-add less than all of the samples of a zero-padded suffix (ZPS) to corresponding samples of an information symbol preceding the ZPS.

Figure 3A:
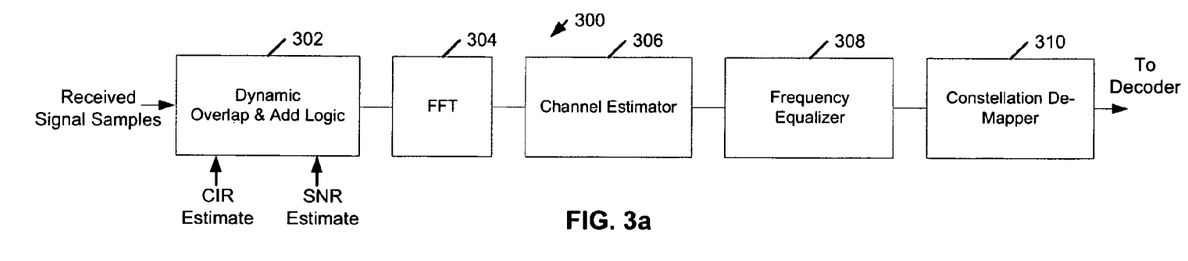
FIG. 3a illustrates a block diagram of a receiver in accordance with an embodiment of the invention.

FIG. 3*a* illustrates a block diagram of a receiver in accordance with an embodiment of the invention. In an embodiment, receiver 300 is part of PHY layer 116*a* previously described. As indicated, in an embodiment, PHY layer 116*a* is compatible with a MB-OFDM physical layer specification. However, receiver 300, its constituent units, and other units or processes described herein are not limited to a particular protocol and may be part of any wired or wireless system that receives information symbols followed by a ZPS. The ZPS provides a mechanism to mitigate multi-path energy and enables a transmitter and receiver to switch between different frequency bands.

As shown in FIG. 3*a*, receiver 300 includes dynamic overlap-and-add (OLA) logic 302 that receives samples of an incoming signal. OLA logic 302 also receives a channel impulse response (CIR) estimate and a signal-to-noise-ratio (SNR) estimate. In an embodiment, based upon the CIR estimate and SNR estimate, OLA logic 302 dynamically performs overlap-and-add operations and provides overlapped-and-added (modified) samples and non-modified samples to FFT logic 304. As described in greater detail, OLA logic 302 also performs overlap-and-add operations when the CIR estimate, SNR estimate, or both are missing.

One of ordinary skill in the art would appreciate that the overlap-and-add operations are part of a convolution process that uses the extra samples of the ZPS to allow multiplication in the frequency domain to be used to form the desired output. As indicated earlier, in some embodiments, in accordance with the disclosure in the '463 application, FFT logic 304 receives at least some unmodified samples of the information symbol preceding a ZPS before any symbol samples are added to the ZPS samples.

FFT logic 304 extracts frequency spectrum data from the incoming signal samples and outputs the frequency spectrum data to channel estimator 306. Channel estimator 306 determines the channel impulse response which is used by frequency equalizer 308 to remove the frequency shaping caused by the communication channel. Frequency equalizer 308 outputs "equalized" frequency spectrum data to constellation de-mapper 310. The output of the frequency equalizer 308 is received by the constellation de-mapper 310, which converts the equalized frequency spectrum data to information symbols that can be decoded by a decoder.

Figure 4A:
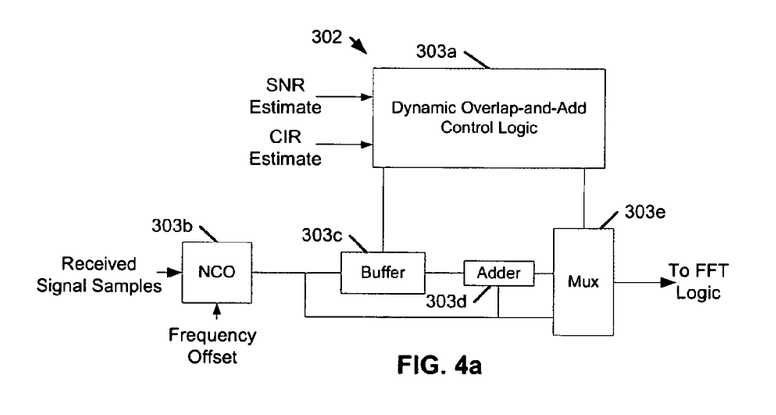
FIG. 4a illustrates a block diagram of OLA logic of FIG. 3a in accordance with an embodiment of the invention.

FIG. 4*a* illustrates a block diagram of OLA logic 302 of FIG. 3*a* in accordance with an embodiment of the invention. As shown in FIG. 4*a*, OLA logic 302 includes dynamic OLA control (OLAC) logic 303*a* that accepts an SNR estimate and a CIR estimate. Based upon the SNR and CIR estimates, OLAC 303*a* sets the OLA length, OLAL, that is used in the overlap-and-add operation of adder 303*d*.

OLA logic 302 includes numerically controlled oscillator (NCO) 303*b* which receives signal samples and a frequency offset indication from a tracking unit (not shown). Based upon the frequency offset indication NCO 303*b* performs complex multiplication on the received signal samples in order to remove the phase offset that results due to the frequency offset between the transmitter oscillator (not shown) and receiver oscillator (not shown). OLA logic 302 also includes buffer 303*c* which receives phase adjusted signal samples of substantially the beginning of an information symbol from NCO 303*b* and stores them temporarily until the OLA operation of adder 303*d* starts. In an embodiment, buffer 303*c* stores N samples at a time, where N, in an embodiment is 32. The number of samples, N, stored by buffer 303*c* is an implementation detail that can vary depending upon the embodiment, as one of ordinary skill in the art would readily appreciate.

The first OLAL samples of an information symbol that are produced by NCO 303*b* are stored in buffer 303*c* and are not provided to adder 303*d* until the OLA operation starts. The next N-OLAL samples of the information symbol that are produced by NCO 303*b* are both stored in buffer 303*c* and are passed to FFT logic 304 via multiplexer (mux) 303*e*. OLAC 303*a* instructs mux 303*e* to pass the N-OLAL samples to FFT logic 304.

As additional samples beyond the first N samples arrive, NCO 303*b* performs the necessary phase adjustment on them and provides them to multiplexer (mux) 303*e*. OLAC 303*a* instructs multiplexer 303*e* to pass an additional 128-N adjusted samples from NCO 303*b* to FFT logic 304 such that a total of 128-OLAL adjusted samples will have been passed to FFT logic 304, where OLAL (OLAL≦N) is the number of stored samples that adder 303*d* adds to an equivalent number of zero-padded suffix samples. In an embodiment, the number, OLAL (or m), of stored samples that are added to an equal number, OLAL, of zero-padded suffix samples is based either upon the SNR and CIR estimates, if any received, by OLAC 303*a* or a default value, DEFVALM. A process for setting the value of OLAL is described in greater detail elsewhere herein.

After 128 symbol samples have been adjusted by NCO 303*b*, zero-padded suffix samples arrive at NCO 303*b* and are phased adjusted as well. As the first OLAL zero-padded suffix adjusted samples emerge from NCO 303*b*, OLAC 303*a* instructs buffer 303*c* to release the buffered samples to adder 303*d*. Adder 303*d* adds the released samples with the corresponding OLAL adjusted zero-padded suffix samples and provides the sum to mux 303*e*. OLAC 303*a* instructs mux 303*e* to pass to FFT logic 304 the output of adder 303*d* rather than the output of NCO 303*b*.

One of ordinary skill in the art would appreciate that timing offsets in a physical implementation may result in some zero-padded suffix samples being considered information symbol samples and vice versa. Thus, the invention is not limited to embodiments in which timing is perfect and information symbol samples are not mistakenly used as zero-padded suffix samples, or vice versa. The foregoing qualification is applicable to all the embodiments described herein.

Figure 4B:
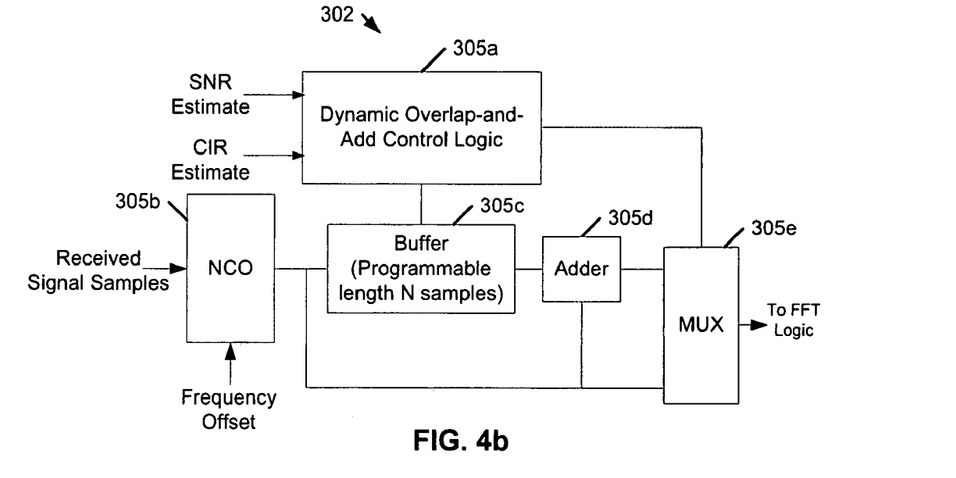
FIG. 4b illustrates a block diagram of OLA logic of FIG. 3a in accordance with an alternative embodiment of the invention.

FIG. 4*b* illustrates a block diagram of OLA logic 302 of FIG. 3*a* in accordance with an alternative embodiment of the invention. As shown in FIG. 4*a*, OLA logic 302 includes dynamic OLA control (OLAC) logic 305*a* that accepts an SNR estimate and a CIR estimate. Based upon the SNR and CIR estimates, OLAC 305*a* sets the OLA length, OLAL, that is used in the overlap-and-add operation of adder 305*d*.

OLA logic 302 of FIG. 4*b* includes numerically controlled oscillator (NCO) 305*b* which receives signal samples and a frequency offset indication from a tracking unit (not shown). Based upon the frequency offset indication, NCO 305*b* performs complex multiplication on the received signal samples in order to remove the phase offset that results due to the frequency offset between the transmitter oscillator (not shown) and receiver oscillator (not shown). OLA logic 302 also includes buffer 305*c* which receives phase-adjusted signal samples from NCO 305*b* and stores them temporarily until the OLA operation of adder 305d starts. Unlike buffer 303c, buffer 305c stores OLAL samples at a time, where OLAL, is set by OLAC 305a based on CIR and SNR estimates or a default value, DEFVALM, and, in an embodiment, varies between 1 and 32. In an embodiment, the OLAL information symbol samples stored in buffer 305c are the OLAL samples that are output by NCO 305b at substantially the beginning of the 128 information symbol samples. While OLAL varies between 1 and 32 in an embodiment, the range over which OLAL varies is an implementation detail that can vary depending upon the embodiment, as one of ordinary skill in the art would readily appreciate.

As additional symbol samples beyond the first OLAL samples arrive, NCO 305b performs the necessary phase adjustment on them and provides them to multiplexer (mux) 305e. OLAC 305a instructs multiplexer 305e to pass 128-OLAL adjusted samples from NCO 305b to FFT logic 304, where OLAL is the number of buffered samples that adder 305d adds to an equivalent number of adjusted ZPS samples. The number, OLAL (or m), of adjusted ZPS samples that are added to an equal number, OLAL, of information symbol samples is based either upon the SNR and CIR estimates, if any received, by OLAC 305a or a default value, DEFVALM. A process for setting the value of OLAL is described in greater detail elsewhere herein. As the last OLAL adjusted information symbol samples emerge from NCO 305b, OLAC 305a instructs buffer 305c to release the buffered samples to adder 305d. Adder 305d adds the OLAL released samples with the corresponding OLAL adjusted ZPS samples and provides the sum to mux 305e. OLAC 305a instructs mux 305e to pass to FFT logic 304 the output of adder 305d rather than the output of NCO 305b.

Figure 4C:
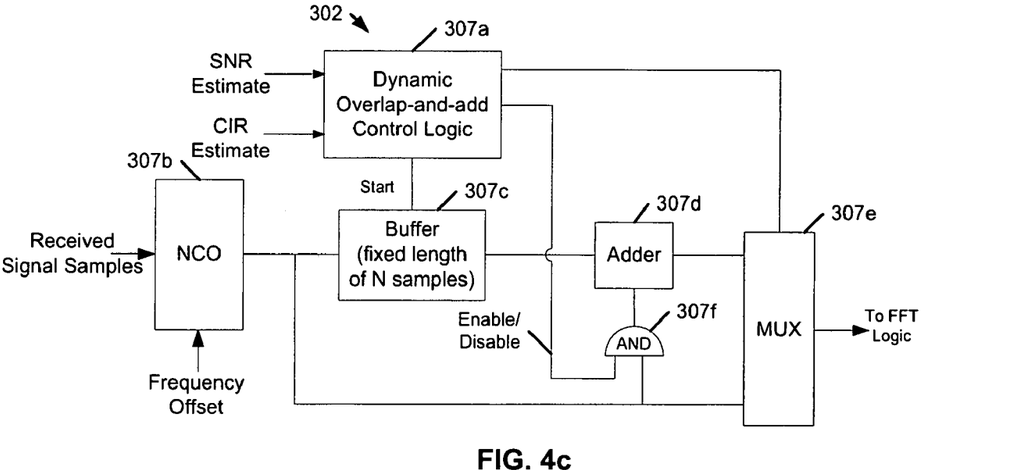
FIG. 4c illustrates a block diagram of OLA logic of FIG. 3a in accordance with yet another alternative embodiment of the invention.

FIG. 4c illustrates a block diagram of OLA logic 302 of FIG. 3a in accordance with an alternative embodiment of the invention. As shown in FIG. 4c, OLA logic 302 includes dynamic OLA control (OLAC) logic 307a that accepts an SNR estimate and a CIR estimate. Based upon the SNR and CIR estimates, OLAC 307a sets the OLA length, OLAL, that is used in the overlap-and-add operation of adder 307d. OLA logic 302 of FIG. 4c allows, as will be apparent from the description herein, FFT logic 304, channel estimator 306 and equalizer 308 to be relatively simple in comparison to the FFT logic 304, channel estimator 306 and equalizer 308 that would work with OLA logic 302 of FIG. 4a, 4b.

OLA logic 302 of FIG. 4c includes numerically controlled oscillator (NCO) 307b which receives signal samples and a frequency offset indication from a tracking unit (not shown). Based upon the frequency offset indication, NCO 307b performs complex multiplication on the received signal samples in order to remove the phase offset that results due to the frequency offset between the transmitter oscillator (not shown) and receiver oscillator (not shown). OLA logic 302 also includes buffer 307c which receives phase-adjusted samples of substantially the beginning of an information symbol from NCO 307b and stores them temporarily until the OLA operation of adder 307d starts. Unlike buffer 305c, buffer 307c stores N samples at a time, where N, in an embodiment is 32. The number of samples, N, stored by buffer 303b is an implementation detail that can vary depending upon the embodiment, as one of ordinary skill in the art would readily appreciate.

As additional information symbol samples beyond the first N samples arrive, NCO 307b performs the necessary phase adjustment on them and provides them to multiplexer (mux) 307e. OLAC 307a instructs multiplexer 307e to pass 128-N phase-adjusted information symbol samples from NCO 307b to FFT logic 304.

When adjusted zero-padded suffix samples start to emerge from NCO 307b, OLAC 307a instructs buffer 307c to output OLAL adjusted information symbol samples to adder 307d. Adder 307d adds the OLAL adjusted information symbol samples from buffer 307c with a corresponding number of incoming zero-padded suffix samples derotated by NCO 307b. OLAC 307a instructs multiplexer 307e to output these summed OLAL samples to FFT logic 304.

After OLAL buffered information symbol samples have been added to a corresponding number of OLAL adjusted ZPS samples, OLAC 307a disables one of the inputs of AND gate 307f and continues to assert the selection line to mux 307e so that the output of adder 307d is selected rather than the output of NCO 307b. Buffer 307c releases the remaining N-OLAL information symbol samples to adder 307d which passes them to mux 307e, and mux 307e passes them to FFT logic 304.

One of ordinary skill in the art would appreciate that in an alternative embodiment, OLA logic 302 of FIG. 4c includes a three-input mux rather than a two-input mux such as mux 307e. In such an alternative embodiment, the third input of the three-input mux accepts the output of buffer 307c. The other two inputs of the three-input mux are as shown in FIG. 4c. Instead of OLAC 307a disabling AND gate 307f and instructing mux 307e to select the output of adder 307d as the last N-OLAL information symbol samples emerge from buffer 307c, it instructs mux 307e to select the output of buffer 307c so that the remaining N-OLAL information samples coming from buffer 307c (rather than summed samples from adder 307d) are passed to FFT logic 304.

As indicated earlier, OLA logic 302 of FIG. 4c allows FFT logic 304, channel estimator 306 and frequency equalizer 308 to be relatively simple because while they are waiting for the OLAL summed samples to emerge from adder 303d they start processing the $(N+1)^{st}$ information symbol sample through the $128^{th}$ information symbol sample. In contrast, the variable store operation in OLA logic 302 of FIGS. 4a, 4b adds complexity because FFT logic 304, channel estimator 306 and equalizer 308 would receive a variable FFT starting sample number depending upon the value for OLAL that was set by OLAC 303a or OLAC 305a. A well-known property of FFTs is that a cyclical shift of samples in the time domain results in a linear phase shift in the frequency domain, and vice versa. Consequently, a variable phase shift as a function of the number of samples stored in the buffer complicates the implementation of FFT logic 304, channel estimator 306 and frequency equalizer 308.

Figure 8A:
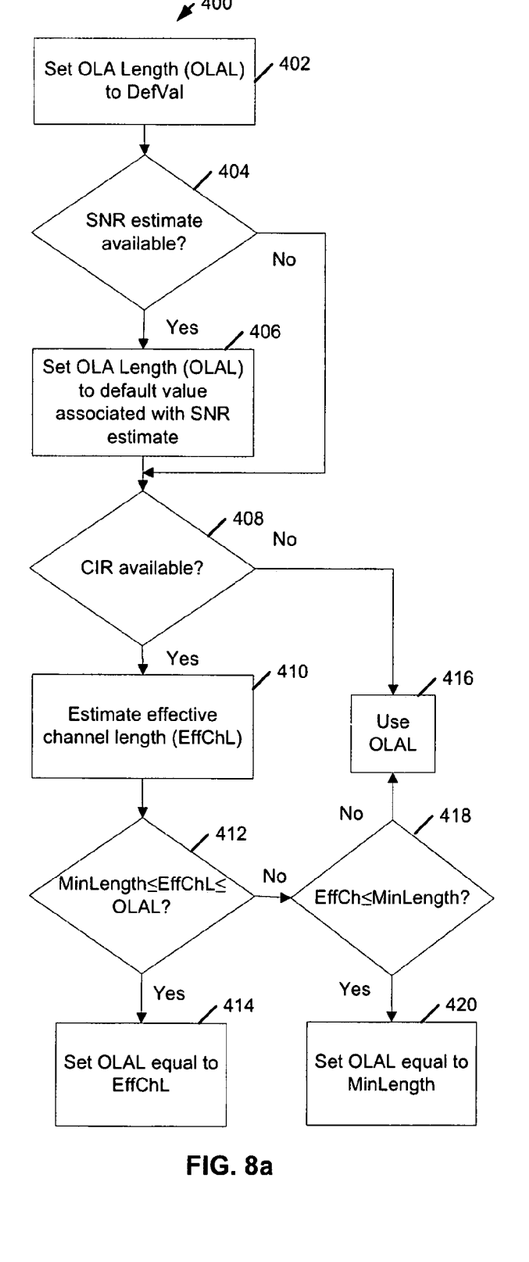
FIG. 8a illustrates a process for setting the overlap-and-add length according to an embodiment of the invention.

One of ordinary skill in the art would appreciate that in an alternative embodiment for each of OLA logic 302 of FIGS. 4a, 4b, and 4c, SNR and CIR estimates are not used to set the overlap-and-add length, but rather a default value is used, FIG. 8a illustrates a process for setting the overlap-and-add length according to an embodiment of the invention. In an embodiment, OLAC 303a performs process 400. In alternative embodiments, OLAC 305a or OLAC 307a performs process 400. In process 400, OLAL is set 402 to a default value, DEFVALM. In an embodiment, DEFVALM is 24 (i.e., 24 samples), but alternative embodiments may use smaller or larger values or even alternate between using smaller or larger values. Continuing with process 400, OLAC 303a determines 404 whether an SNR estimate is available. When an SNR estimate is available for the packet being received, OLAC 303a sets 406 OLAL to a value that corresponds to the SNR estimate. In an embodiment, SNR estimates are divided into three categories—High SNR, Medium SNR, and Low SNR—and each of the categories has a one-to-one correspondence with an OLAL value. In an embodiment, High SNR is associated with an OLAL value of 28 samples. Medium SNR is associated with an OLAL value of 16 samples. Low SNR is associated with an OLAL value of 8. OLAC 303*a* then determines 408 whether a channel impulse response (CIR) estimate is available. When a CIR estimate is not available, OLAC 303*a* uses 416 OLAL as previously set in process 400 to control elements 303*b* through 303*f* in OLA logic 302 of FIG. 4*a*.

Figure 7:
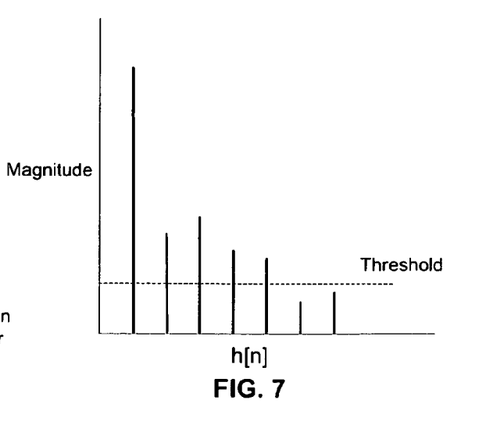
FIG. 7 illustrates a channel impulse magnitude response estimate some of whose coefficients exceed a threshold according to an embodiment of the invention.
Figure 8B:
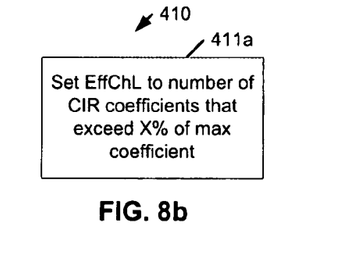
FIG. 8b illustrates in greater detail the effective channel length estimation operation of FIG. 8a in accordance with an embodiment of the invention.

When a CIR estimate is available, OLAC 303*a* estimates 410 the effective channel length (EffChL). FIG. 8*b* illustrates in greater detail the effective channel length estimation operation of FIG. 8*a* in accordance with an embodiment of the invention. In an embodiment, OLAC 303*a* estimates 411*a* the effective channel length by determining the number of coefficients in the CIR estimate with magnitude that exceeds a threshold value that is X% of the largest coefficient magnitude. FIG. 7 illustrates a channel impulse magnitude response estimate some of whose coefficients exceed a threshold according to an embodiment of the invention. OLAC 303*a* sets 411*a* EffChL to the number of CIR estimate coefficients that exceed the threshold value of X% of the magnitude of the largest coefficient. In an embodiment, X is set to 20, X has other values in alternative embodiments. In an alternative embodiment, X is set according to SNR estimates received by OLAC 303*a*.

Continuing with process 400, OLAC 303*a* then determines 412 whether EffChL is greater than or equal to an OLA minimum length (OALML) and less than or equal to the present value of OLAL. When EffChL is either not greater than or equal to an OLA minimum length (OALML) or not less than or equal to the present value of OLAL, OLAC 303*a* determines 418 whether EffChL is less than or equal to OALML. When EffChL is less than or equal to OALML, OLAC 303*a* sets 420 OLAL to OALML.

When OLAC 303*a* determines that EffChL is not less than or equal to OALML, OLAC 303*a* uses 416 the present value of OLAL (i.e., default value, DEFVALM) in performing the overlap-and-add control related operations described herein in connection with FIG. 4*a*.

Figure 2B:
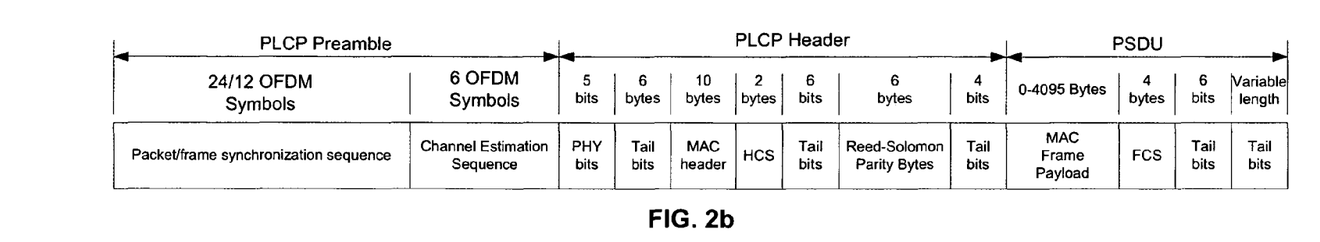
FIG. 2b illustrates a packet and its component elements according to an embodiment of the invention.
Figure 8C:
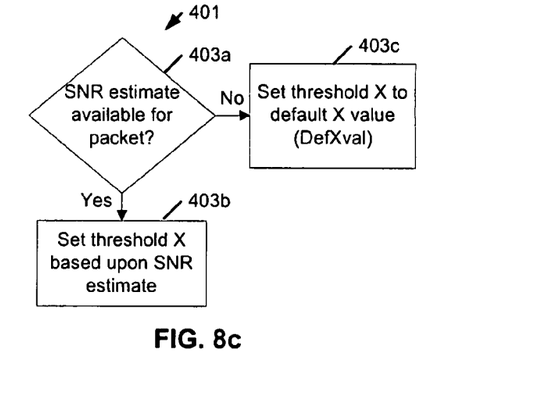
FIG. 8c illustrates a process for setting a threshold value used to determine effective channel length according to an embodiment of the invention.

FIG. 8*c* illustrates a process for setting a threshold value used to determine effective channel length according to an embodiment of the invention. In process 401, OLAC 303*a* determines 403*a* whether an SNR estimate is available for a packet. When an SNR estimate is available for a packet, OLAC 303*a* sets 403*b* X to a value based on the SNR estimate. A larger value of X is used for low SNR values and vice versa. For low SNR values, in an embodiment, X is greater than 40. For high SNR values, in an embodiment, X is less than 20. In an embodiment, the SNR estimate is determined as part of receiving a packet's preamble and/or physical layer convergence protocol (PLCP) header. FIG. 2*b* illustrates a packet and its component elements according to an embodiment of the invention. When an SNR estimate is not available for a packet, OLAC 303*a* sets X to a default value. In an embodiment, the default value of X is 20.

CIR estimates and SNR estimates can be made through a variety of techniques. Several techniques are illustrated herein. However, one of ordinary skill in the art would appreciate that the invention is not limited to any particular technique. The immediately foregoing point is emphasized by FIG. 3*a* which illustrates OLA logic 302 of receiver 300 as accepting SNR and CIR estimates.

Figure 3B:
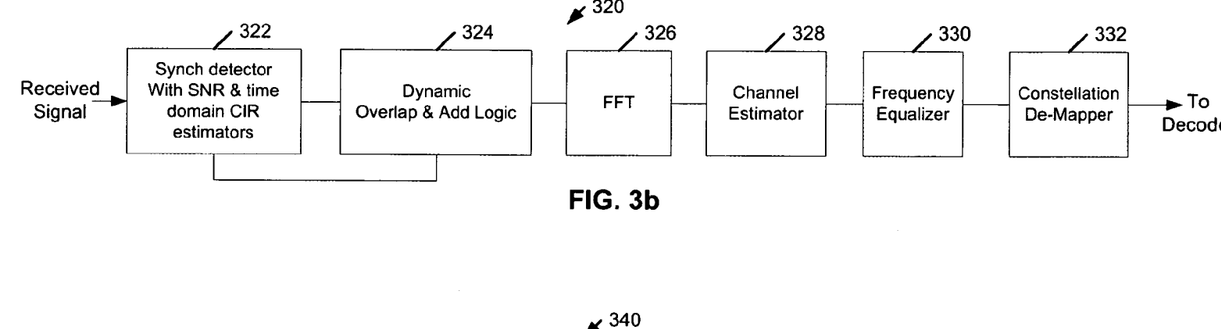
FIG. 3b illustrates a block diagram of a receiver according to an alternative embodiment of the invention.

FIG. 3*b* illustrates a block diagram of a receiver according to an alternative embodiment of the invention. Receiver 320 includes synch detector 322 which includes a SNR and time domain CIR estimator. In addition to performing packet and frame synchronization when the preamble of a packet is being received (see FIG. 2*b*), synch detector 322 applies a matched filter to the synch sequence of the preamble on a per symbol basis to create a per symbol CIR estimate. Matched filters are well known in the art and need not be described in greater detail herein.

In an embodiment, the CIR estimates for several symbols are averaged by synch detector 322, and synch detector 322 provides an average CIR estimate to OLA logic 324 to use as the CIR estimate. In an alternative embodiment, detector 322 provides the per symbol CIR estimate to logic 324 for averaging into a CIR estimate.

Synch detector 322 also generates a SNR estimate which it provides to OLA logic 324. In an embodiment, detector 322 averages the absolute value (or alternatively squared value) of the differences between normalized received samples of similar symbols in the synch sequence. The average of the differences is mapped to an SNR value and detector 322 provides to OLA logic 324 the SNR value as the SNR estimate. The remaining units 324 through 332 of receiver 320 operate in the same manner as their corresponding units described in connection with receiver 300 of FIG. 3*a*, and need not be described again.

Figure 3C:
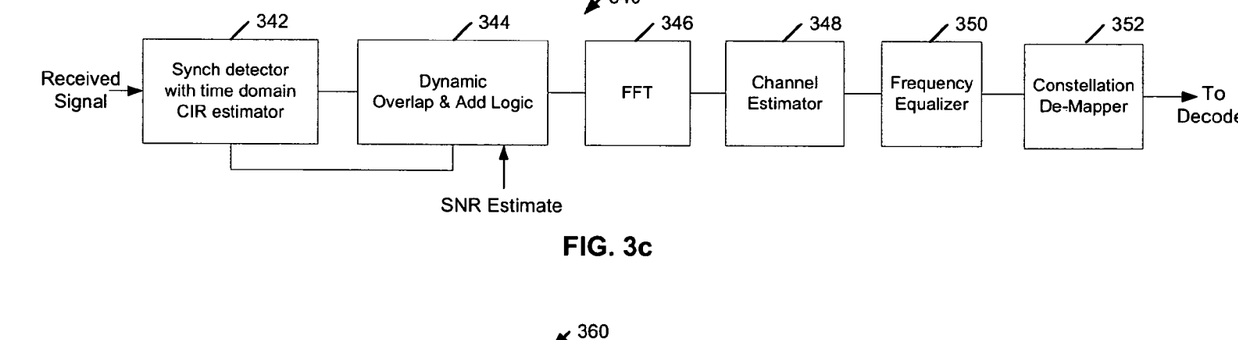
FIG. 3c illustrates a block diagram of a receiver according to an alternative embodiment of the invention.

FIG. 3*c* illustrates a block diagram of a receiver according to an alternative embodiment of the invention. Receiver 340 includes dynamic OLA logic 344 that receives a CIR estimate from synch detector 342. Detector 342 generates the CIR estimate(s) as described elsewhere herein and the generation of CIR estimates need not be described again. Dynamic OLA logic 344 also receives an SNR estimate.

Figure 5:
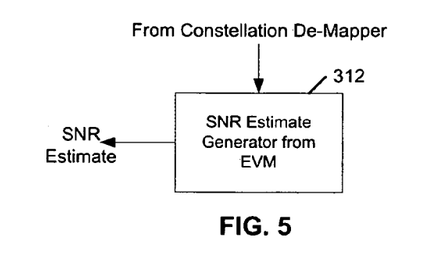
FIG. 5 illustrates an SNR estimate generator based on an error vector magnitude metric.

As indicated, there are a variety of techniques for producing an SNR estimate and the invention is not limited to any particular technique. FIG. 5 illustrates an SNR estimate generator based on an error vector magnitude metric. In an embodiment, SNR estimate generator 312 receives symbol samples from constellation de-mapper 310. SNR estimate generator 312 determines the error distance between the received symbol samples and their corresponding ideal constellation symbol which is defined by the type of modulation being used. Based upon the error distances, generator 312 determines an error vector magnitude (EVM) metric and maps the EVM metric to an SNR estimate and provides the SNR estimate, depending upon the embodiment under consideration, to one of OLA logic 302, 344, and 354. Some embodiments of receivers 300, 340, and 360, include SNR estimate generator 312.

In an embodiment, SNR estimate generator 312 generates a more accurate SNR estimate by determining the EVM metric for the data portion of a packet (see FIG. 2*b*). After generator 312 provides a more accurate SNR estimate to, depending upon the embodiment, OLA logic 302, 344, and 354, logic 302, 344, and 354, depending upon the embodiment, uses the new more accurate SNR estimate in performing a process such as process 400 described in connection with FIG. 8.

Figure 6:
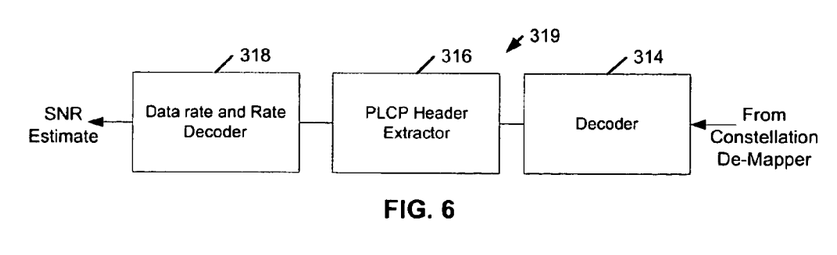
FIG. 6 illustrates an SNR estimate generator according to an alternative embodiment of the invention.

FIG. 6 illustrates an SNR estimate generator according to an alternative embodiment of the invention. SNR estimate generator 319 comprises a decoder 314 that receives de-mapped symbols from a constellation de-mapper such de-mapper 310. Decoder 314 decodes the de-mapped symbols and provides the decoded information to PLCP header extractor 316 which disassembles the header of a packet (see FIG. 2*b*). Header extractor 316 provides the fields of the header that relate to data rate to data rate and rate decoder 318. In an embodiment, based upon the rate being used, decoder 318 provides an SNR estimate to, depending upon the embodiment, one of OLA logic 302, 344, and 354. When the rate is high, the SNR estimate is high. When the rate is low, the SNR estimate is low, and when the rate is medium the SNR estimate is medium. One ordinary skill in the art would appreciate that the invention is not limited to the classifications low, medium or high and that other classifications and types of mapping may be used.

Figure 3D:
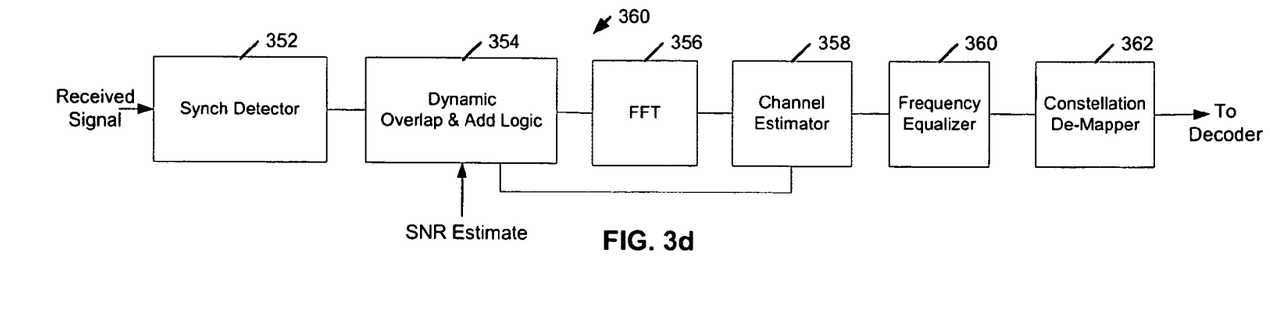
FIG. 3d illustrates a block diagram of a receiver according to an alternative embodiment of the invention.

FIG. 3d illustrates a receiver according to an alternative embodiment of the invention. Receiver 360 includes a channel estimator 358 that provides a CIR estimate to OLA logic 354. The manner in which channel estimators produce channel estimates is well known in the art and need not be described in greater detail herein. OLA logic 354 also receives an SNR estimate that is generated according to one of the techniques described herein or equivalents known in the art. In an embodiment, logic 354 receives the SNR estimate from synch detector 352 which generates the SNR estimate in accordance with the description provided above in connection with detector 322 of FIG. 3b. Using the received CIR and SNR estimates, OLA logic 354 performs a process such as process 400. The remaining units 356, 358, 360 and 362 of FIG. 3d operate in a manner similar to corresponding units 304, 306, 308, and 310 in FIG. 3a and need not be described in greater detail herein.

Returning to synch detector 322 of FIG. 3b, in an embodiment, detector 322 produces a CIR estimate through a process of cross-correlation and averaging when the preamble of a packet is being received. With the transmitted preamble sequence represented by x(n), the received sequence of the preamble can be described by the following equation, Eq. 1:

$$r(n) = \sum_{i=0}^{N-1} x(i-k)h(k) + n(i) \qquad \text{Eq. 1}$$

where n(i) is additive white Gaussian noise (AWGN) with variance $\sigma^2$, h(k) is the CIR. If the preamble sequence is assumed to have an ideal auto-correlation (it actually only approximates the ideal) as illustrated by Eq. 2

$$\phi_{xx}(m) = \sum_{i=0}^{N-1} x(i+m)x(i) = \delta(m) \qquad \text{Eq. 2}$$

then the cross-correlation between the transmitted and received signals will be as given by Eq. 3, $$\phi_{rx}(m) = \sum_{i=0}^{N-1} r(i+m)x(i) = \hat{h}(m) \qquad \text{Eq. 3}$$

where $\hat{h}(m)$ is the estimated CIR. This $\hat{h}(m)$ is estimated on several symbols in the preamble. The results are averaged and provided by detector 322 to OLA logic 324.

In an alternative embodiment, detector 322 generates a CIR estimate by using a least means square (LMS) technique during the channel estimation sequence (see FIG. 2b). The LMS estimate may be represented by the following two equations, Eqs. 4 and 5, $$e_k = r_k - y_k \qquad \text{Eq. 4}$$

$$\hat{h}_{k+1} = \hat{h}_k + \mu e_k x_k^* \qquad \text{Eq. 5}$$

where $e_k$ is an estimation error, $r_k$ is the received signal, $y_k$ is the estimated received signal, $x_k$ is the channel estimation input sequence, and $\mu$ is an adaptive step-size. One of ordinary skill in the art would appreciate that the tracking performance and stability of the LMS estimate is generally dependent on the adaptive step-size, $\mu$, and would be able to select the step-size that would work for a particular implementation of an embodiment according to the invention.

In the preceding specification, the invention has been described with reference to specific exemplary embodiments of the invention. It will, however, be evident to one of ordinary skill in the art that various modifications and changes may be made without departing from the broader spirit and scope of the invention as set forth in the claims that follow. The specification and drawings are accordingly to be regarded in an illustrative rather than restrictive sense and the intention is not to be limited to the details given herein, but rather to be modified within the scope of the appended claims along with their full scope of equivalents. The various elements or components described herein may be combined or integrated in another system or certain features may be omitted, or not implemented. Embodiments can be expressed as—and are not limited to—components, processes, systems, articles of manufacture, compositions of matter, and apparatus with some, all, or a fraction of the features described herein.

What is claimed is:

1. A method of adjusting overlap-and-add length for zero-padded suffixes, wherein a minimum length is less than a default overlap-and-add length, the method comprising:
    based on a channel impulse response, estimating an effective channel length;
    when the effective channel length is less than the default overlap-and-add length and greater than the minimum length, setting the overlap-and-add length to the effective channel length;
    when the effective channel length is less than the minimum length, setting the overlap-and-add length to the minimum length; and
    when the effective channel length is greater than the default overlap-and-add length, setting the overlap-and-add length to the default overlap-and-add length.

2. The method of claim 1, wherein estimating the effective channel length includes determining the number of coefficients in the channel impulse response each of which has an associated magnitude that is at least equal to a threshold that is based upon the magnitude of the largest coefficient in the channel impulse response.

3. The method of claim 1, wherein estimating the effective channel length includes determining the number of coefficients in the channel impulse response each of which has an associated magnitude that exceeds a threshold that is based upon the magnitude of the largest coefficient in the channel impulse response.

4. The method of claim 3, further comprising adjusting the threshold based upon a signal-to-noise ratio estimate.

5. The method of claim 4, further comprising determining the signal-to-noise ratio estimate.

6. The method of claim 5, wherein determining the signal-to-noise ratio estimate includes averaging successive magnitude representations of differences among samples of similar normalized received synchronization sequence symbols.

7. The method of claim 5, wherein the signal-to-noise ratio estimate is based on a data rate indicated in a header of a received packet.

8. The method of claim 5, wherein the signal-to-noise ratio estimate is based upon an error vector magnitude metric.

9. The method of claim 5, wherein the signal-to-noise ratio estimate is based upon an error vector magnitude metric determined for a data portion of a received packet.

10. The method of claim 1, further comprising determining the channel impulse response.

11. The method of claim 10, wherein determining the channel impulse response includes cross correlating received synchronization sequence symbols with stored training synchronization sequence symbols.

12. The method of claim 1, further comprising, when the effective channel length is less than a default overlap-and-add length and greater than a minimum length, performing an overlap-and-add operation for zero-padded suffix samples based upon the effective channel length.

13. The method of claim 1, further comprising, when the effective channel length is less than or equal to the minimum length, performing an overlap-and-add operation for zero-padded suffix samples based upon the minimum length.

14. The method of claim 1, further comprising, when the effective channel length is greater than the default overlap-and-add length, performing an overlap-and-add operation for zero-padded suffix samples based upon the default overlap-add-length.

15. An apparatus that determines an overlap-and-add length for a received signal, the apparatus comprising:
control logic that is to estimate, based on a channel impulse response, an effective channel length, wherein when the effective channel length is less than a default overlap-and-add length and greater than a minimum length, the control logic is to set the overlap-and-add length to the effective channel length, when the effective channel length is less than or equal to the minimum length, the control logic is to set the overlap-and-add length to the minimum length, and when the effective channel length is greater than the default overlap-and-add length, the control logic is to set the overlap-and-add length to the default overlap-and-add length.

16. The apparatus of claim 15, further comprising:
a buffer coupled to the control logic and that is to store samples of a symbol; and
an adder coupled to the control logic that is to add m zero-padded suffix samples to corresponding m stored samples to produce m modified samples, wherein m is based on the overlap-and-add length set by the control logic.

17. The apparatus of claim 15, wherein, to estimate the effective channel length, the control logic is to determine the number of coefficients in the channel impulse response each of which has an associated magnitude that exceeds a threshold that is based upon the magnitude of the largest coefficient in the channel impulse response.

18. The apparatus of claim 17, wherein the control logic is to adjust the threshold based upon a signal-to-noise ratio estimate.

19. The apparatus of claim 18, further comprising a signal-to-noise ratio estimator that is to provide the signal-to-noise ratio estimate to the control logic.

20. The apparatus of claim 19, wherein the signal-to-noise ratio estimator is to determine the signal-to-noise-ratio estimate by averaging successive magnitude representations of differences among samples of similar normalized received synchronization sequence symbols.

21. The apparatus of claim 19, wherein the signal-to-noise ratio estimator is to provide, based on a data rate indicated in a header of a received packet, the signal-to-noise ratio estimate.

22. The apparatus of claim 19, wherein the signal-to-noise ratio estimator is to provide, based upon an error vector magnitude metric, the signal-to-noise ratio estimate.

23. The apparatus of claim 19, wherein the signal-to-noise ratio estimator is to provide, based upon an error vector magnitude metric determined for a data portion of a received packet, the signal-to-noise ratio estimate.

24. The apparatus of claim 15, further comprising a channel impulse response estimator coupled to the control logic and that is to determine the channel impulse response.

25. The apparatus of claim 24, wherein the channel impulse response estimator is to determine the channel impulse response by cross correlating received synchronization sequence symbols with stored training synchronization sequence symbols.

26. The apparatus of claim 15, further comprising:
a buffer coupled to the control logic and that is to store samples of a symbol;
an adder coupled to the control logic that is to add m zero-padded suffix samples to corresponding m stored samples to produce m modified samples, wherein m is based on the overlap-and-add-length set by the control logic; and
wherein, when the effective channel length is less than a default overlap-and-add length and greater than a minimum length, the control logic is to instruct the buffer and adder to perform an overlap-and-add operation for zero-padded suffix samples based upon m, wherein m is equivalent to the effective channel length.

27. The apparatus of claim 15, further comprising:
a buffer coupled to the control logic and that is to store samples of a symbol;
an adder coupled to the control logic that is to add m zero-padded suffix samples to corresponding m stored samples to produce m modified samples, wherein m is based on the overlap-and-add length set by the control logic; and
wherein, when the effective channel length is less than or equal to the minimum length, the control logic is to instruct the buffer and adder to perform an overlap-and-add operation for zero-padded suffix samples based upon m, wherein m is equivalent to the minimum length.

28. The apparatus of claim 15, further comprising:
a buffer coupled to the control logic and that is to store samples of a symbol;
an adder coupled to the control logic that is to add m zero-pad suffix samples to corresponding m stored samples to produce m modified samples, wherein m is based on the overlap-add-length set by the control logic; and
wherein, when the effective channel length is greater than the default overlap-and-add length, the control logic is to instruct the buffer and adder to perform an overlap-and-add operation for zero-padded suffix samples based upon m, wherein m is equivalent to the default overlap-and-add length.

* * * * *